UNITED STATES PATENT OFFICE.

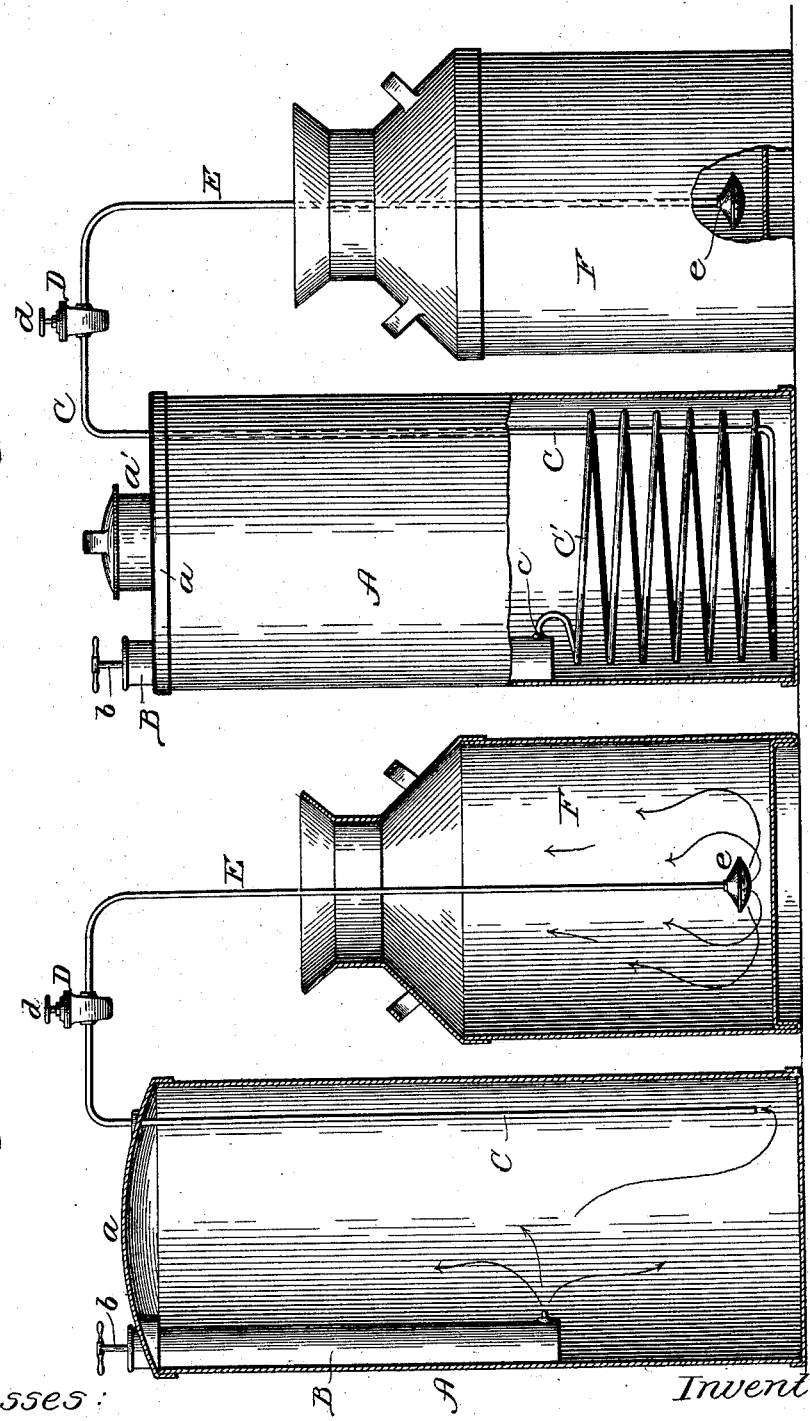

FRANK P. SHEPHERD, OF ELGIN, ILLINOIS.

APPARATUS FOR AERATING MILK.

SPECIFICATION forming part of Letters Patent No. 669,861, dated March 12, 1901.

Application filed August 6, 1900. Serial No. 26,041. (No model.)

*To all whom it may concern:*

Be it known that I, FRANK P. SHEPHERD, a citizen of the United States, residing at Elgin, in the county of Kane and State of Illinois, have invented a certain new and useful Improvement in Apparatus for Cooling or Aerating Milk, of which the following is a specification.

It is well known that in order to keep milk in proper condition and against souring quickly the animal heat should be withdrawn therefrom and the milk be thereby cooled. This is especially true of milk intended to be shipped any considerable distance for future use or consumption. It is desirable to have the animal heat withdrawn and the milk cooled expeditiously in order to make the shipment as quickly as possible.

The object of the present invention is to construct an apparatus by the use of which milk can have the animal heat withdrawn therefrom and become cooled by a cooling process employing air under pressure for the purpose.

The invention consists in the construction and combination of parts hereinafter described and claimed.

In the drawings illustrating the invention in one form of application, Figure 1 is a sectional elevation showing the cooling means in one form of arrangement; and Fig. 2, a side elevation, partly in section, showing the cooling means in a modified form of construction and arrangement.

The medium for cooling the milk in order to withdraw the animal heat is air under pressure and of the required degree of coolness to properly act and perform the work. The apparatus for forcing air under pressure into the milk should be one having a regulated, steady, and uniform pressure, and an apparatus for the purpose and of the nature required is illustrated in the drawings, though it is to be understood the construction and arrangement may be varied.

The apparatus shown in Fig. 1 consists of a reservoir or tank A of any suitable construction as to dimensions and made of sheet metal or other suitable material for containing compressed air. An air-compressing pump B of suitable construction has its body entered into the receiver or tank A and in the construction shown is suspended from the cap or cover $a$ of the receiver or tank, which cap or cover is air-tight on the receiver or tank. This compressing-pump may be of a construction having a cylinder in which is a piston operated by a stem or rod $b$, with a handle on its end or otherwise constructed, so that the piston or plunger of the pump can be operated to force air into the receiver or tank through the discharge tube or nipple $c$. A discharge or eduction pipe C for the compressed air extends down within the receiver or tank nearly to the bottom thereof, and this pipe is carried through the cap or cover $a$ and is connected with a pressure-regulator valve D, having a stem $d$, by means of which the valve can be set for any desired pressure and so that the pressure will be uniform in discharging air from the receiver or tank through the pipe C. A delivery-pipe E is connected with the pressure-regulator D, and the delivery end of the pipe is preferably provided with a rose or perforated head $e$, though such rose or perforated head is not a necessity; but by its use the compressed air discharged from the delivery-pipe will be projected in jets or streams, thereby giving a more extended application of the air. The delivery-pipe E is to be entered into a milk can or receptacle F, with its discharge end adjacent to the bottom of the can or receptacle, so that the discharged air under pressure will be projected into the milk at the bottom of the can and be forced up through the body of the milk to pass out at the open mouth of the can or receptacle.

The compressed-air receiver or tank of the form shown in Fig. 1 can be used where the air is of the required degree of coolness without other cooling means, and where the air is too warm or not of the proper temperature any desired means that will give a reduced temperature for cooling the interior of the receiver or tank can be employed, thereby cooling the air forced thereinto by the compression-pump for the cooled air to pass out and through the pressure-regulator into the milk can or receptacle.

The operation is as follows: The air to be utilized in withdrawing the animal heat from the milk and cooling the milk is forced into the receiver or tank by operating the compression-pump. The pressure-regulator is set for the required pressure, and the cooled air from the receiver or tank passes through the discharge or eduction pipe into the pressure-regulator and from such regulator passes through the delivery-pipe into the milk can or receptacle, discharging at the bottom of the can or receptacle and forcing its way up through the milk, withdrawing the animal heat in its upward passage and effectually and thoroughly cooling the milk. The air passing through the pressure-regulator will be maintained at a uniform and regulated pressure and will enter the milk under the same conditions, so that the action of the air must be uniform and regular, thus insuring the requisite action for withdrawing the latent heat and performing the cooling operation.

The apparatus illustrated in Fig. 2 of the drawings is of the same general construction and operates in the same manner as the apparatus illustrated in Fig. 1, differing from such apparatus in the provision of a coil C', connected to the discharging tube or nipple $c$ of the compression-pump and to the lower end of the discharging or eduction pipe C. The receiver or tank of the construction shown in Fig. 2 is intended to receive within its interior ice, cold water, or other cooling medium for the air passing through the coil and so that the air will be reduced in temperature to the degree required for entering the milk can or receptacle and perform the work of withdrawing the animal heat and cooling the milk. The ice or cooling medium can be entered into the receiver or tank through an opening in the top $a$, closed by a cover $a'$ or otherwise.

While the invention is primarily designed and intended for use for cooling or aerating milk, it is adapted for use and can be used for cooling or aerating other liquids where it is desired to have the cooling or aerating agent operate under a regulated and uniform pressure conformable to the requirements for operation.

I claim—

1. In an apparatus for cooling or aerating milk, the combination of a receiver or tank for compressed air, a compression-pump delivering air into the receiver or tank, a discharge or eduction pipe for the air from the receiver or tank, a pressure-regulator delivering air under a predetermined, regular and uniform flow and pressure and a delivery-pipe for air under pressure from the pressure-regulator, substantially as described.

2. In an apparatus for cooling or aerating milk, the combination of a receiver or tank for compressed air, a compression-pump delivering air into the receiver or tank, a discharge or eduction pipe for the air from the receiver or tank, a pressure-regulator, delivering air under a predetermined, regular and uniform flow and pressure, a delivery-pipe for air under pressure from the pressure-regulator, and a discharge-head at the end of the delivery-pipe, substantially as described.

FRANK P. SHEPHERD.

Witnesses:
EPHRAIM BANNING,
THOMAS B. MCGREGOR.